US010249257B2

United States Patent
Ooishi et al.

(10) Patent No.: US 10,249,257 B2
(45) Date of Patent: Apr. 2, 2019

(54) DISPLAY DEVICE AND DRIVE METHOD OF THE DISPLAY DEVICE

(71) Applicant: Panasonic Liquid Crystal Display Co., Ltd., Himeji-shi, Hyogo (JP)

(72) Inventors: Yoshihisa Ooishi, Kanagawa (JP); Daisuke Kajita, Hyogo (JP); Genshiro Kawachi, Hyogo (JP); Sachiko Yamazaki, Osaka (JP); Kuniaki Amano, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 200 days.

(21) Appl. No.: 15/280,573

(22) Filed: Sep. 29, 2016

(65) Prior Publication Data

US 2017/0092219 A1 Mar. 30, 2017

(30) Foreign Application Priority Data

Sep. 30, 2015 (JP) .................................. 2015-195061

(51) Int. Cl.
  *G09G 3/36* (2006.01)
  *G02F 1/1368* (2006.01)
  *G02F 1/1362* (2006.01)
  *G02F 1/1343* (2006.01)

(52) U.S. Cl.
  CPC ......... *G09G 3/3696* (2013.01); *G02F 1/1368* (2013.01); *G02F 1/136286* (2013.01); *G09G 3/3688* (2013.01); *G02F 1/134309* (2013.01); *G02F 2201/121* (2013.01); *G02F 2201/123* (2013.01); *G09G 2300/0426* (2013.01); *G09G 2300/0814* (2013.01); *G09G 2310/08* (2013.01)

(58) Field of Classification Search
  CPC combination set(s) only.
  See application file for complete search history.

(56) References Cited

U.S. PATENT DOCUMENTS

| | | | |
|---|---|---|---|
| 2015/0029081 A1* | 1/2015 | Kawachi | G02F 1/13452 345/92 |
| 2016/0042713 A1* | 2/2016 | Sim | G09G 3/3674 345/87 |

FOREIGN PATENT DOCUMENTS

JP 2008-077007 4/2008

* cited by examiner

*Primary Examiner* — Stephen G Sherman
*Assistant Examiner* — Andre L Matthews
(74) *Attorney, Agent, or Firm* — Hamre, Schumann, Mueller & Larson, P.C.

(57) ABSTRACT

A display device comprises: data lines extending in a first direction; gate lines extending in a second direction, and being divided into groups each of which has the gate lines adjacent in the first direction; selection signal supplying wirings each of which is provided in each group, and connected to each control electrode of the selector transistors corresponding to the group; gate voltage supplying wirings connected to the other conductive electrode of each of the selector transistors corresponding to the group; and wherein a gate driver supplies a second gate voltage having a voltage level lower than that of a first gate voltage to at least one of the gate voltage supplying wirings in each of the groups before supplying the first gate voltage in order to turn on a pixel transistor disposed in an intersection portion of the data line and the gate line.

8 Claims, 9 Drawing Sheets

Related Art

FIG.5

Related Art

FIG.6

Related Art

TIME t(s): Vgh2=10V→Vgh1=15V

FIG.9

TIME t(s): Vgh2=5V→Vgh1=15V

DISPLAY DEVICE AND DRIVE METHOD OF THE DISPLAY DEVICE

CROSS-REFERENCE TO RELATED APPLICATION

This application claims priority from Japanese application JP2015-195061, filed Sep. 30, 2015. This Japanese application is incorporated herein by reference.

TECHNICAL FIELD

The present invention relates to a display device and a drive method of the display device.

BACKGROUND

Nowadays, in a display panel, the number of gate lines increases due to high resolution. With increasing number of gate lines, the number of lead wirings of the gate lines increases to enlarge an area of a frame region. Therefore, for example, JP2008-77007A discloses a driving system in which the gate lines are scanned in each block (group) while divided into a plurality of blocks. In the driving system of JP2008-77007A, the number of lead wirings of the gate lines is decreased, so that the area of the frame region can be reduced.

SUMMARY

However, in the conventional technology, the following problem occurs. Generally, a thin film transistor (TFT) has a property of decreasing a drain current with lapse of time after application of a gate-on voltage. Because of the property, in the display device with the driving system, an output voltage at a thin film transistor of a selector switch, the output voltage being the gate-on voltage at a thin film transistor provided in a pixel, is maximized for the output voltage supplied to a head-line (first) gate line in the block, and minimized for the output voltage supplied to a final-line (for example, 30th) gate line in the block. Therefore, a difference in output voltage between the final-line gate line of the precedently-scanned block and the head-line gate line of the subsequently-scanned block increases in the two blocks adjacent to each other. Particularly, when aging occurs in the selector switch, display unevenness such as a step is easily viewed in a region corresponding to a boundary between the blocks in a display image.

An object of the present disclosure is to reduce the display unevenness in the display device with the driving system that scans the gate lines in each group.

To solve the above problem, a display device according to the present disclosure comprises: a plurality of data lines extending in a first direction; a plurality of gate lines extending in a second direction, the plurality of gate lines divided into groups that are adjacent in the first direction; a plurality of selector transistors, each of which including a first conductive electrode and a second conductive electrode, wherein the first conductive electrode for each of the plurality of selector transistors is connected to an end of a gate line of the plurality of gate lines; a plurality of selection signal supplying wirings, each of which is provided for a corresponding group and connected to a control electrode of a corresponding selector transistor of the plurality of the selector transistors for the corresponding group; a plurality of gate voltage supplying wirings that are connected to the second conductive electrode of one of the selector transistors for each of the groups; and a gate driver that sequentially supplies a first gate voltage to the plurality of gate voltage supplying wirings while supplying a control voltage to the plurality of selection signal supplying wirings in order to turn on or off the plurality of selector transistors, wherein the gate driver supplies a second gate voltage to at least one of the plurality of gate voltage supplying wirings for each of the groups before supplying the first gate voltage in order to turn on a pixel transistor disposed at an intersection portion of a data line among the plurality of data lines and a gate line among the plurality of gate lines, wherein the second gate voltage is lower than the first gate voltage.

In the display device according to the present disclosure, the gate driver may supply the second gate voltage to each of the gate voltage supplying wirings before supplying the first gate voltage.

In the display device according to the present disclosure, the gate driver may supply the second gate voltage to a gate voltage supplying wiring among the plurality of gate voltage supply wirings connected to a gate line among the plurality of gate lines disposed near a boundary between the two adjacent groups among the plurality of groups before supplying the first gate voltage.

In the display device according to the present disclosure, for a first gate line and a second gate line among the plurality of gate lines that are adjacent to each other in a scanning direction, the gate driver may supply the second gate voltage to a gate voltage supplying wiring connected to the second gate line during a time interval in which the first gate voltage is supplied to a gate voltage supplying wiring connected to the first gate line.

In the display device according to the present disclosure, the first gate voltage is Vgh1 and the second gate voltage is Vgh2, and the second gate voltage Vgh2 may be set to satisfy $(Vgh1)/3 \le Vgh2 < Vgh1$.

In the display device according to the present disclosure, a resistor may be provided on a power supply line of the second gate voltage.

In the display device according to the present disclosure, a signal waveform of the first gate voltage supplied to each of the plurality of gate voltage supplying wirings may include a stepwise shape rising from a first half toward a second half.

In the display device according to the present disclosure, a signal waveform of the first gate voltage supplied to each of the plurality of gate voltage supplying wirings may include a slope shape that rises gradually from a first half toward a second half.

In the display device according to the present disclosure, the second gate voltage may have a voltage level at which the pixel transistor is turned on.

To solve the above problem, a drive method of a display device including a plurality of data lines extending in a first direction, a plurality of gate lines extending in a second direction, the plurality of gate lines divided into groups that are adjacent in the first direction, a plurality of selector transistors, each of which including a first conductive electrode and a second conductive electrode, wherein the first conductive electrode for each of the plurality of selector transistors is connected to an end of a gate line of the plurality of gate lines, a plurality of selection signal supplying wirings, each of which is provided for a corresponding group and connected to a control electrode of a corresponding selector transistor of the plurality of the selector transistors for the corresponding group, a plurality of gate voltage supplying wirings that are connected to the second conductive electrode of one of the selector transistors for each of the groups, and a gate driver that supplies a gate voltage to the plurality of gate voltage supplying wirings while supplying a control voltage to the plurality of selection signal supplying wirings in order to turn on or off the plurality of selector transistors, the drive method comprises: sequentially suppling, via the gate driver, a first gate voltage to the plurality of gate voltage supplying wirings while supplying a control voltage to the plurality of selection signal supplying wirings in order to turn on or off the selector transistor; sequentially suppling, via the gate driver, a second gate voltage having a voltage level lower than the first gate voltage to at least one gate voltage supplying wiring among the plurality of gate voltage supplying wirings in each of the groups; and turning on, via the first gate voltage, a pixel transistor that is disposed in an intersection portion of a data line among the plurality of data lines and a gate line among the plurality of gate lines, wherein the second gate voltage is supplied to the at least one gate voltage supplying wiring before the first gate voltage turns on the pixel transistor.

In the display device of the present disclosure and the driving system thereof, the display device with the driving system that scans the gate lines in each group can be reduced.

DETAILED DESCRIPTION

Hereinafter, an exemplary embodiment of the present disclosure will be described with reference to the drawings. In the exemplary embodiment, a liquid crystal display device is described as an example of the display device. However the present disclosure is not limited to this. For example the present disclosure may be an organic electroluminescence display (OLED) device. In addition, in the exemplary embodiment, although a liquid crystal display with COG (Chip On Glass) technology is described as an example, the present disclosure is not limited to this. For example, the present disclosure may be a liquid crystal display with COF (Chip On Film) technology or TCP (Tape Carrier Package) technology.

Figure 1:
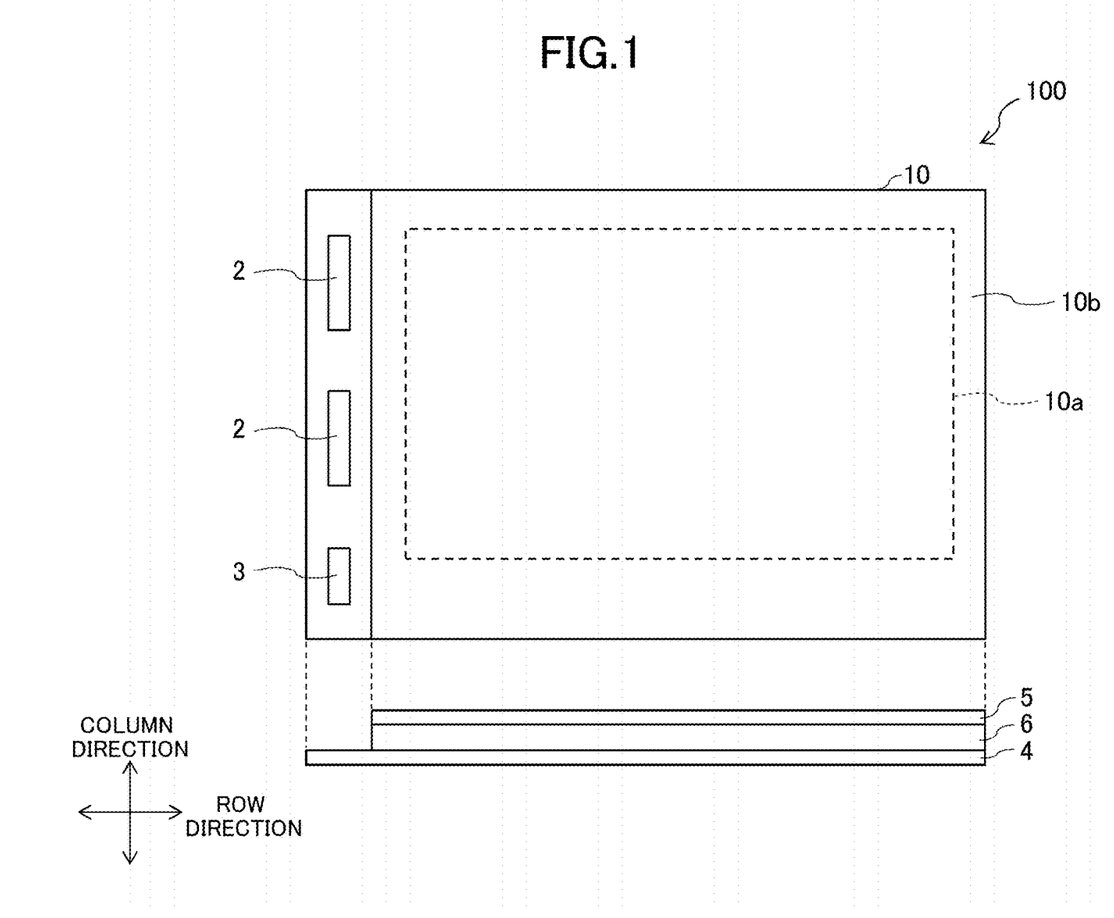
FIG. 1 is plan and side views illustrating a schematic configuration of a liquid crystal display device according to an exemplary embodiment.

FIG. 1 is plan and side views illustrating a schematic configuration of a liquid crystal display device according to an exemplary embodiment. Liquid crystal display device 100 includes display panel 10, source driver IC 2, gate driver IC 3, and a backlight device (not illustrated). Display panel 10 includes thin film transistor substrate 4 (TFT substrate), color-filter substrate 5 (CF substrate), and liquid crystal layer 6 sandwiched between the substrates. Source driver IC 2 and gate driver IC 3 are directly mounted on a glass substrate constituting TFT substrate 4. Source driver IC 2 and gate driver IC 3 are arranged in line along one edge of display panel 10. There is no limitation to the numbers of source driver ICs and gate driver ICs. Display panel 10 includes display region 10a that displays an image and frame region 10b around display region 10a.

Figure 2:
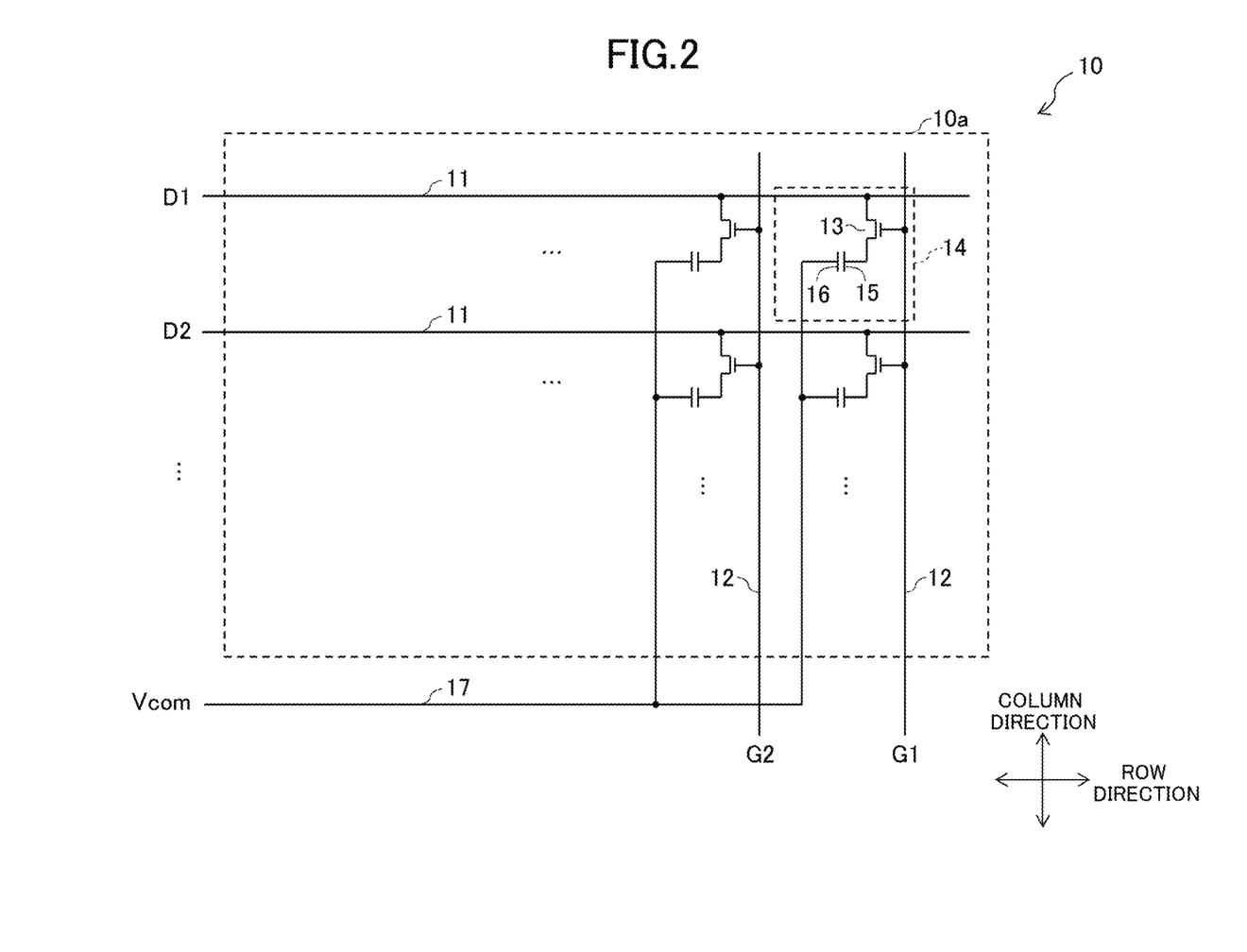
FIG. 2 is a plan view illustrating a schematic configuration of a display panel of the exemplary embodiment.

FIG. 2 is a plan view illustrating a schematic configuration of display region 10a in display panel 10. A plurality of data lines 11 extending in a first direction (for example, a row direction) and a plurality of gate lines 12 extending in a second direction (for example, a column direction) are provided in display panel 10. A thin film transistor (hereinafter, referred to as a pixel TFT) 13 is provided in an intersection portion of each data line 11 and each gate line 12. Each data line 11 is electrically connected to a corresponding source driver IC (see FIG. 1), and each gate line 12 is electrically connected to a gate driver IC (see FIG. 1). First data line D1 is disposed at an end in the column direction of the plurality of data lines 11, and second data line D2 is adjacent to first data line D1 in the column direction. First gate line G1 is disposed at an end in the row direction of the plurality of gate lines 12, and second gate line G2 is adjacent to first gate line G1 in the row direction.

In display panel 10, a plurality of pixels 14 are arranged into a matrix shape (in the row and column directions) according to intersection portions of data lines 11 and gate lines 12. A plurality of pixel electrodes 15 disposed in each pixel 14 and a common electrode 16 common to the plurality of pixels 14 are provided in TFT substrate 4. Common electrode 16 may be provided in CF substrate 5.

A data signal (data voltage) is supplied to each data line 11 from corresponding source driver IC 2. A gate signal (a gate-on voltage, a pre-gate voltage, and a gate-off voltage (to be described later)) is supplied to each gate line 12 from gate driver IC 3. Common voltage Vcom is supplied to common electrode 16 from a common driver (not illustrated) through common wiring 17. When an on voltage (gate-on voltage) of the gate signal is supplied to gate line 12, pixel TFT 13 connected to gate line 12 is turned on to supply the data voltage to pixel electrode 15 through data line 11 connected to pixel TFT 13. An electric field is generated by a difference between the data voltage supplied to pixel electrode 15 and common voltage Vcom supplied to common electrode 16. The liquid crystal is driven by the electric field to control transmittance of light transmitted from a backlight, thereby displaying the image. Desired data voltages are applied to data signal lines 11 connected to pixel electrodes 15 of pixels 14, which are formed by striped color filters to correspond to red, green, and blue, thereby performing color display.

Figure 3:
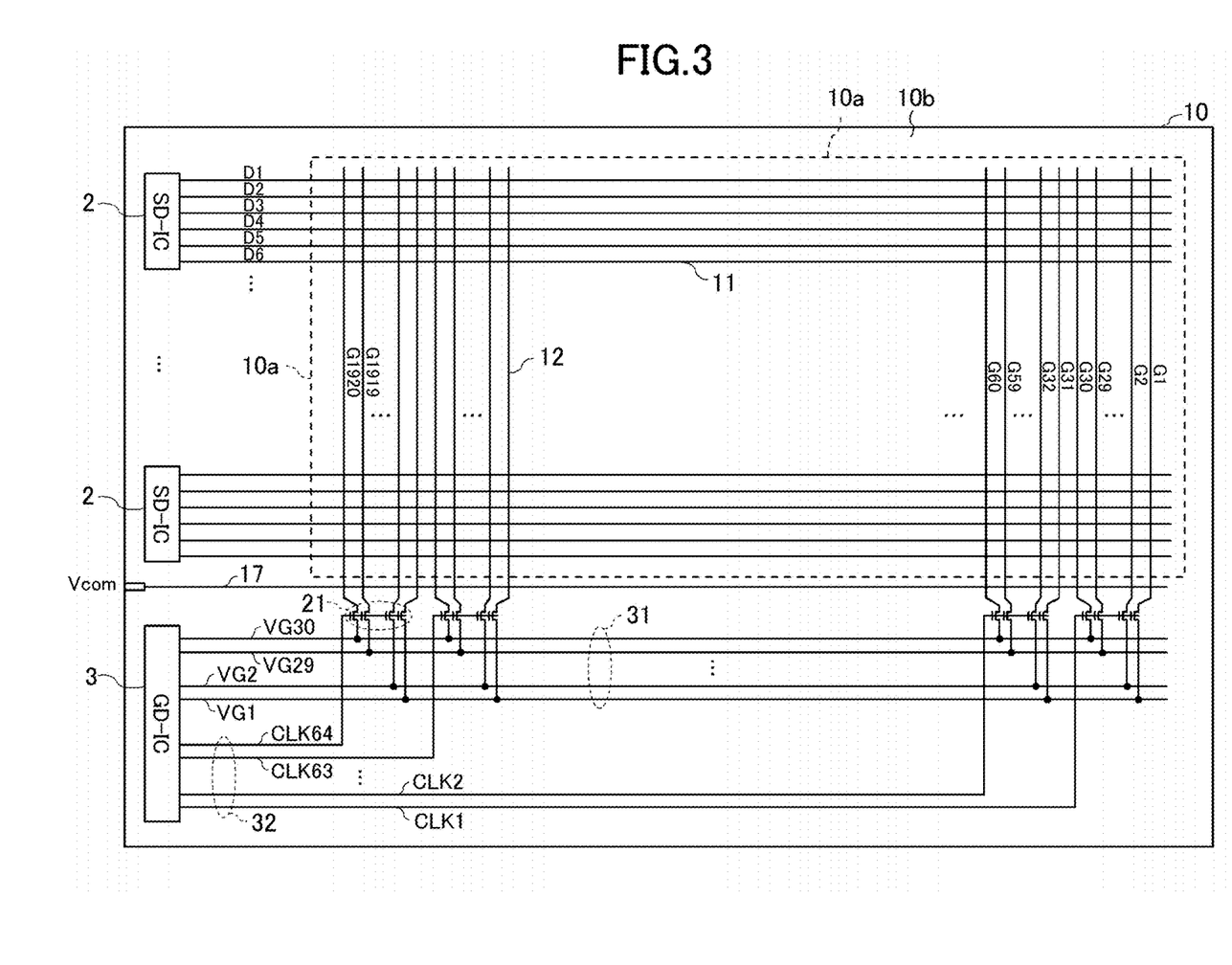
FIG. 3 is a plan view illustrating a detailed configuration of the display panel of the exemplary embodiment.

FIG. 3 is a plan view illustrating a detailed configuration of display panel 10. Source driver IC 2 (SD-IC) electrically connected to one end of each data line 11, gate driver IC 3 (GD-IC) electrically connected to one end of each gate line 12, and terminal Vcom connected to one end of common wiring 17 are disposed in a peripheral portion (a left side in FIG. 3) of frame region 10b of display panel 10. The other end of gate line 12 is connected to one of conductive electrodes (source electrode) of gate-selector thin film transistor (hereinafter, referred to as a selector TFT) 21, and the other conductive electrode (drain electrode) of selector TFT 21 is electrically connected to gate voltage supplying wiring 31. Selector TFT 21 acts as a switch that selects corresponding gate line 12. The plurality of gate lines 12 are electrically connected to one gate voltage supplying wiring 31. Specifically, for example, in the case that the number of gate lines 12 is 1920, 1st, 31st, 61st, . . . , 1891st gate lines G1, G31, G61, . . . , G1891 are connected to gate voltage supplying wiring VG1 through corresponding selector TFTs 21, and 2nd, 32nd, 62nd, . . . , 1892nd gate lines G2, G32, G62, . . . , G1892 are connected to gate voltage supplying wiring VG2 through corresponding selector TFTs 21. Similarly, 30th, 60th, 90th, . . . , 1920th gate lines G30, G60, G90, . . . , G1920 are connected to gate voltage supplying wiring VG30 through corresponding selector TFTs 21. In the example of FIG. 3, gate line 12 is connected to identical gate voltage supplying wiring 31 in each 30 gate lines 12. 64 gate lines 12 are electrically connected to one gate voltage supplying wiring 31. 30 adjacent gate lines 12 connected to gate voltage supplying wirings VG1 to VG30 constitute one group. For example, gate lines G1 to G30 constitute one group (first group), gate lines G31 to G60 constitute one group (2nd group), and gate lines G1891 to G1920 constitute one group (64th group). In the example of FIG. 3, gate line 12 includes 64 groups.

Each of the control electrodes (gate electrodes) of 30 selector TFTs 21 corresponding to one group is connected to identical selection signal supplying wiring 32. For example, in the first group including gate lines G1 to G30, each of the control electrodes of 30 selector TFTs 21 connected to gate lines G1 to G30 is connected to selection signal supplying wiring CLK1. For example, in the 2nd group including gate lines G31 to G60, each of the control electrodes of 30 selector TFTs 21 connected to gate lines G31 to G60 is connected to selection signal supplying wiring CLK2. Similarly, in the 64th group including gate lines G1891 to G1920, each of the control electrodes of 30 selector TFTs 21 connected to gate lines G1891 to G1920 is connected to selection signal supplying wiring CLK64. That is, different selection signal supplying wiring 32 is provided for each group.

Figure 4:
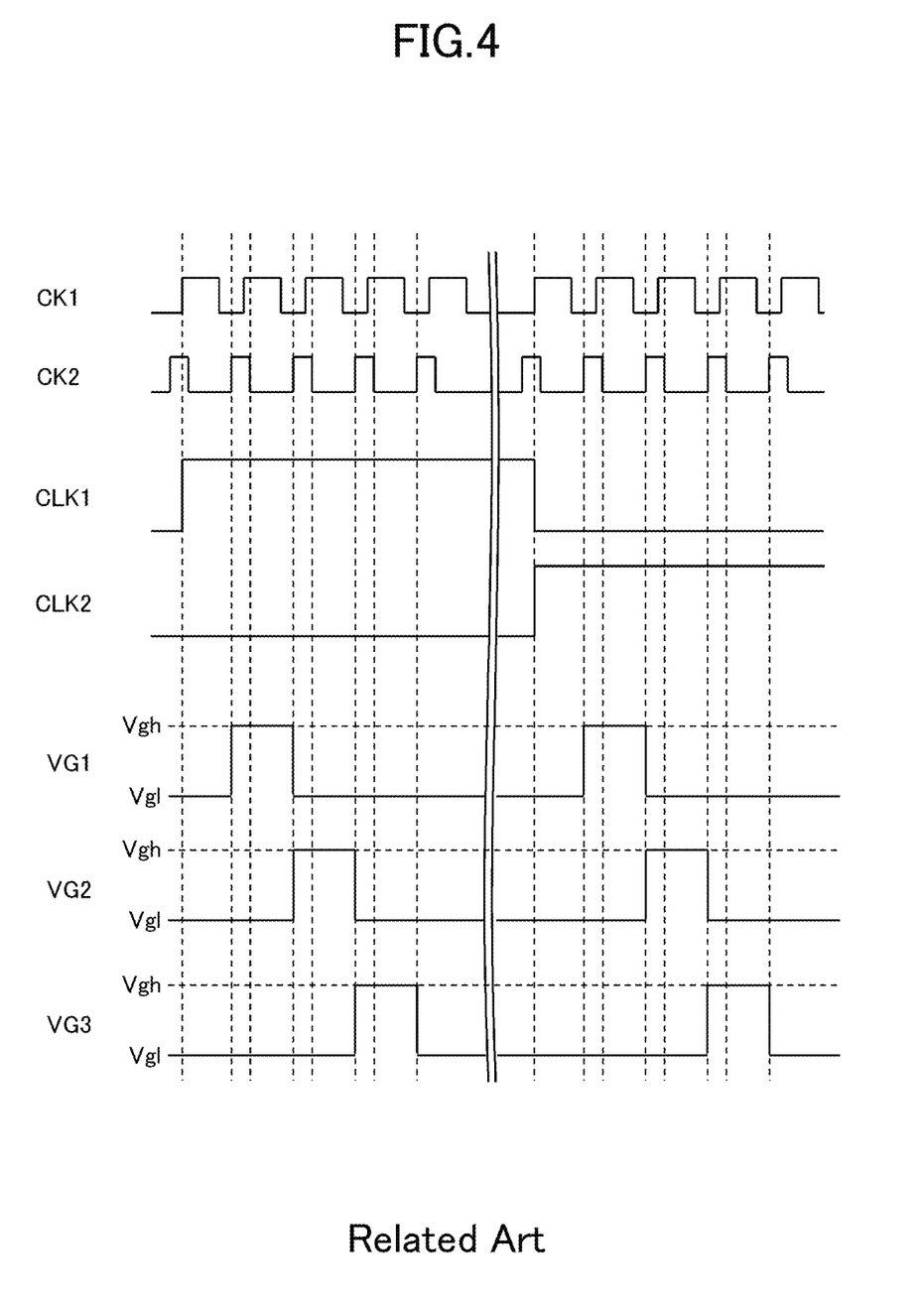
FIG. 4 is a timing chart illustrating an operation of the display panel with a general gate selector type.

An operation of a display panel with a general gate selector type will be described below. FIG. 4 is a timing chart illustrating the operation of the display panel with the general gate selector type. The operation of the display panel (see FIG. 3) in the case that the gate driver IC supplies usual gate-on voltage Vgh and gate-off voltage Vgl to each of gate voltage supplying wirings VG1 to VG30 will be described below. In FIG. 4, clocks CK1, CK2 are input from control circuit (not illustrated) to gate driver IC 3, voltages CLK1, CLK2 are supplied to selection signal supplying wirings CLK1, CLK2, and voltages VG1 to VG30 are supplied to gate voltage supplying wirings VG1 to VG30.

First, at rise timing of clock CK1, gate driver IC 3 supplies voltage Vsh to selection signal supplying wiring CLK1 to turn on selector TFTs 21. Therefore, selector TFTs 21 connected to gate lines G1 to G30 of the first group are put into an on state. Then, at rise timing of clock CK2, gate driver IC 3 supplies a voltage (gate-on voltage Vgh) to gate voltage supplying wiring VG1 to turn on pixel TFTs 13 (see FIG. 2). Therefore, first-column pixel TFTs 13 connected to gate line G1 are put into the on state, and the data voltage output from source driver IC 2 is supplied to first-column pixel electrodes 15 through data lines 11 connected to pixel TFTs 13. Then, at the rise timing of clock CK2, gate driver IC 3 supplies gate-on voltage Vgh to gate voltage supplying wiring VG2 while supplying a voltage (gate-off voltage Vgl) to gate voltage supplying wiring to turn off pixel TFTs 13. Therefore, first-column pixel TFTs 13 connected to gate line G1 are turned off, second-column pixel TFTs 13 connected to gate line G2 are put into the on state, and the data voltage output from source driver IC 2 is supplied to second-column pixel electrodes 15 through data lines 11 connected to pixel TFTs 13. Thus, in display panel 10, first-group gate lines G1 to G30 are sequentially driven to supply the data voltage to corresponding pixel electrode 15.

Then, at the rise timing of clock CK1, gate driver IC 3 supplies voltage Vsh to selection signal supplying wiring CLK2 while supplying voltage Vsl to selection signal supplying wiring CLK1 to turn off selector TFTs 21. Therefore, selector TFTs 21 connected to first-group gate lines G1 to G30 are turned off, and selector TFTs 21 connected to second-group gate lines G31 to G60 are put into the on state. Then, at the rise timing of clock CK2, gate driver IC 3 supplies gate-on voltage Vgh to gate voltage supplying wiring VG1. Therefore, 31st-column pixel TFTs 13 connected to gate line G31 are put into the on state, and the data voltage output from source driver IC 2 is supplied to 31st-column pixel electrodes 15 through data lines 11 connected to pixel TFTs 13 Then, at the rise timing of clock CK2, gate driver IC 3 supplies gate-on voltage Vgh to gate voltage supplying wiring VG2 while supplying gate-off voltage Vgl to gate voltage supplying wiring VG1. Therefore, 31st-column pixel TFTs 13 connected to gate line G31 are turned off, 32nd-column pixel TFTs 13 connected to gate line G32 are put into the on state, and the data voltage output from source driver IC 2 is supplied to 32nd-column pixel electrodes 15 through data lines 11 connected to pixel TFTs 13. Thus, in display panel 10, second-group gate lines G31 to G60 are sequentially driven to supply the data voltage to corresponding pixel electrode 15.

Hereinafter, in display panel 10, the groups are sequentially driven to supply the data voltage to corresponding pixel electrode 15.

In the above configuration, because the number of wirings connected to gate driver IC 3 can be decreased smaller than the number of gate lines 12, the area of the frame region in the column direction can be reduced compared to a configuration in which all gate lines 12 are drawn to the gate driver IC.

Figure 5:
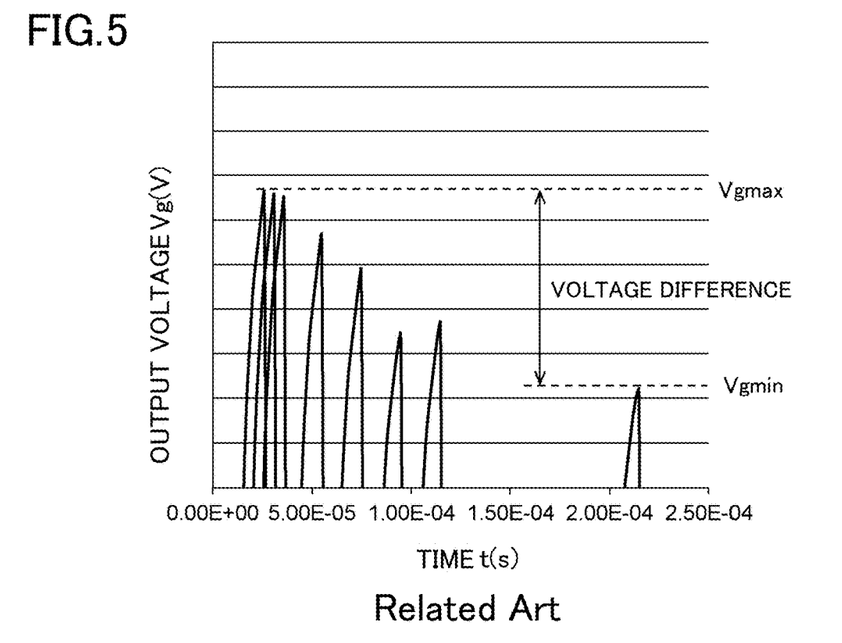
FIG. 5 is a graph illustrating a relationship between output voltage Vg(V) and time t(s) that elapses after application of gate-on voltage Vgh in FIG. 4 in a selector TFT.
Figure 6:
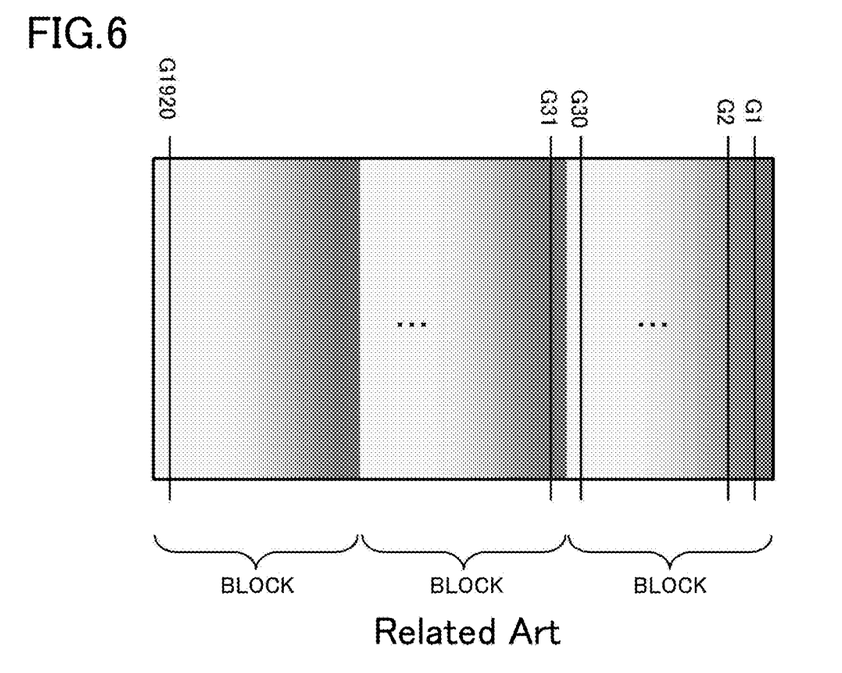
FIG. 6 is a view illustrating a step (display unevenness) of a display image.

However, as described above, in the above operating method, there is the problem in that the display unevenness such as the step is easily viewed in the region corresponding to the boundary between the blocks (groups) in the display image. FIG. 5 is a graph illustrating a relationship between output voltage Vg(V) and time t(s) that elapses after application of gate-on voltage Vgh in FIG. 4 in the selector TFT. As illustrated in FIG. 5, due to the property of the thin film transistor, the output voltage decreases with elapse of time after the application of gate-on voltage Vgh. For this reason, for example, a difference between the output voltage (maximum output voltage Vgmax) supplied to head (first) gate line G1 in the block and the output voltage (minimum output voltage Vgmin) supplied to final (30th) gate line G30 increases. In FIG. 5, a graph at the left end corresponds to a change in output voltage supplied to first gate line G1 in the block, and a graph at the right end corresponds to a change in output voltage supplied to 30th gate line G30 in the block. In a block adjacent to the above block, output voltage supplied to 31st gate line G31 becomes identical to the output voltage supplied to first gate line G1. Therefore, the voltage difference similar to the maximum voltage difference in one block occurs at the boundary between the blocks adjacent to each other. The voltage difference appears as the step (display unevenness) in the region corresponding to the boundary between the blocks in the display image.

Liquid crystal display device 100 of the exemplary embodiment has a configuration that can reduce the display unevenness. The configuration will be described in detail below.

Figure 7:
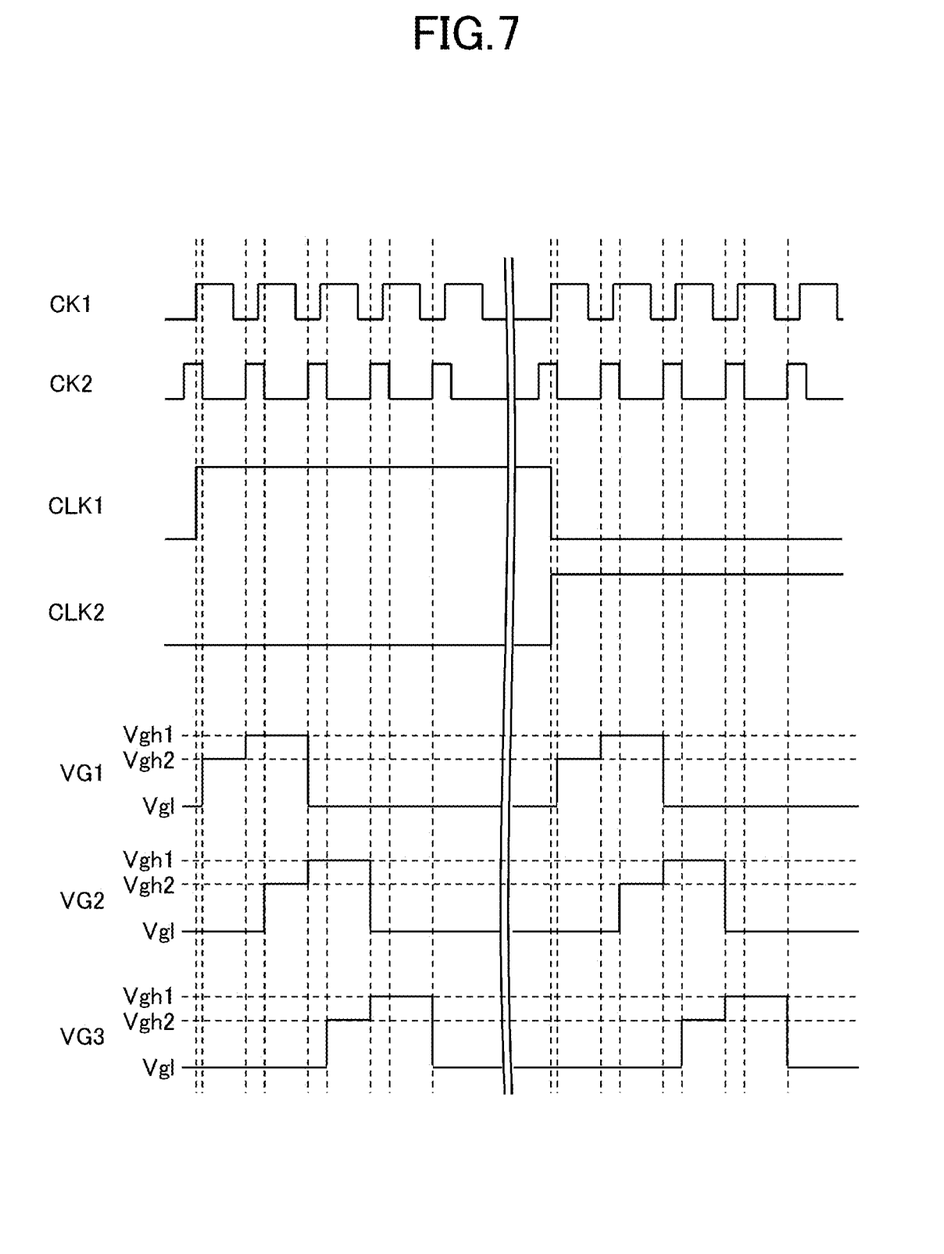
FIG. 7 is a timing chart illustrating an operation of the display panel with a gate selector system of the exemplary embodiment.

FIG. 7 is a timing chart illustrating an operation of display panel 10 with a gate selector system of the exemplary embodiment. In FIG. 7, clocks CK1, CK2 are input from control circuit (not illustrated) to gate driver IC 3, voltages CLK1, CLK2 are supplied to selection signal supplying wirings CLK1, CLK2, and voltages VG1 to VG30 are supplied to gate voltage supplying wirings VG1 to VG30. In FIG. 7, voltage Vgh1 (first gate voltage) is used to turn on pixel TFT 13 (see FIG. 2). For example, voltage Vgh1 has a voltage level (potential) equal to voltage Vgh in FIG. 4. The voltage level of voltage Vgh2 (pre-gate voltage) (second gate voltage) is lower than that of voltage Vgh1. Voltage Vgh2 may have the voltage level at which pixel TFT 13 is turned on.

First, at rise timing of clock CK1, gate driver IC 3 supplies voltage Vsh to selection signal supplying wiring CLK1 to turn on selector TFTs 21. Therefore, selector TFTs 21 connected to gate lines G1 to G30 of the first group are put into an on state. Then, at fall timing of clock CK2, gate driver IC 3 supplies pre-gate voltage Vgh2 to gate voltage supplying wiring VG1. Then, at the rise timing of clock CK2, gate driver IC 3 supplies voltage Vgh1 to gate voltage supplying wiring VG1. Therefore, the output voltages at selector TFTs 21 connected to gate line G1 rise from Vgh2 to Vgh1. First-column pixel TFTs 13 connected to gate line G1 are put into the on state, and the data voltage output from source driver IC 2 is supplied to first-column pixel electrodes 15 through data lines 11 connected to pixel TFTs 13. In a time interval during which voltage Vgh1 is supplied to gate voltage supplying wiring VG1, gate driver IC 3 supplies pre-gate voltage Vgh2 to gate voltage supplying wiring VG2 at the fall timing of clock CK2.

Then, at the rise timing of clock CK2, gate driver IC 3 supplies voltage Vgh1 to gate voltage supplying wiring VG2 while supplying gate-off voltage Vgl to gate voltage supplying wiring VG1. Therefore, the output voltages at the selector TFTs 21 connected to gate line G1 fall from Vgh1 to Vghl, and the output voltages at the selector TFTs 21 connected to gate line G2 rise from Vgh2 to Vgh1. First-column pixel TFTs 13 connected to gate line G1 are turned off, second-column pixel TFTs 13 connected to gate line G2 are put into the on state, and the data voltage output from source driver IC 2 is supplied to second-column pixel electrodes 15 through data lines 11 connected to pixel TFTs 13. Thus, in display panel 10, first-group gate lines G1 to G30 are sequentially driven to supply the data voltage to corresponding pixel electrode 15. Pre-gate voltage Vgh2 having the voltage level lower than voltage Vgh1 is supplied to each of gate lines G1 to G30 before voltage Vgh1 is supplied.

Then, at the rise timing of clock CK1, gate driver IC 3 supplies voltage Vsh to selection signal supplying wiring CLK2 while supplying voltage Vsl to selection signal supplying wiring CLK1 to turn off selector TFTs 21. Therefore, selector TFTs 21 connected to first-group gate lines G1 to G30 are turned off, and selector TFTs 21 connected to second-group gate lines G31 to G60 are put into the on state. Then, at fall timing of clock CK2, gate driver IC 3 supplies pre-gate voltage Vgh2 to gate voltage supplying wiring VG1. Then, at the rise timing of clock CK2, gate driver IC 3 supplies voltage Vgh1 to gate voltage supplying wiring VG1. Therefore, the output voltages at selector TFTs 21 connected to gate line G31 rise from Vgh2 to Vgh1. 31st-column pixel TFTs 13 connected to gate line G31 are put into the on state, and the data voltage output from source driver IC 2 is supplied to 31st-column pixel electrodes 15 through data lines 11 connected to pixel TFTs 13. In a time interval during which voltage Vgh1 is supplied to gate voltage supplying wiring VG1, gate driver IC 3 supplies pre-gate voltage Vgh2 to gate voltage supplying wiring VG2 at the fall timing of clock CK2.

Then, at the rise timing of clock CK2, gate driver IC 3 supplies voltage Vgh1 to gate voltage supplying wiring VG2 while supplying gate-off voltage Vgl to gate voltage supplying wiring VG1. Therefore, the output voltages at the selector TFTs 21 connected to gate line G31 fall from Vgh1 to Vghl, and the output voltages at the selector TFTs 21 connected to gate line G32 rise from Vgh2 to Vgh1. 31st-column pixel TFTs 13 connected to gate line G31 are turned off, 32nd-column pixel TFTs 13 connected to gate line G32 are put into the on state, and the data voltage output from source driver IC 2 is supplied to 32nd-column pixel electrodes 15 through data lines 11 connected to pixel TFTs 13. Thus, in display panel 10, second-group gate lines G31 to G60 are sequentially driven to supply the data voltage to corresponding pixel electrode 15. Pre-gate voltage Vgh2 having the voltage level lower than voltage Vgh1 is supplied to each of gate lines G31 to G60 before voltage Vgh1 is supplied.

Hereinafter, in display panel 10, the groups are sequentially driven to supply the data voltage to corresponding pixel electrode 15.

Figure 8:
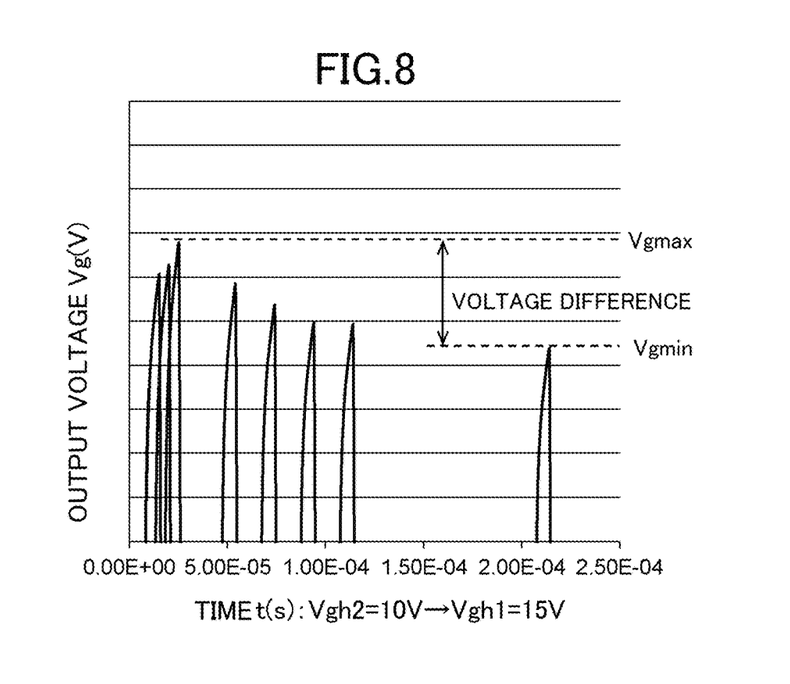
FIG. 8 is a graph illustrating a relationship between output voltage Vg(V) and time t(s) that elapses after the application of gate-on voltage Vgh in FIG. 7 in the selector TFT in a method for operating the display panel of the exemplary embodiment.

In the method for operating display panel 10 of the exemplary embodiment, the output voltage at selector TFT 21 is temporarily raised from gate-off voltage Vgl to pre-gate voltage Vgh2, and then raised to voltage Vgh1. That is, the output voltage at selector TFT 21 is raised in stages. FIG. 8 is a graph illustrating a relationship between output voltage Vg(V) and time t(s) that elapses after application of gate-on voltage Vgh in FIG. 7 in selector TFT 21 in the method for operating display panel 10. As illustrated in FIG. 7, in the operating method of the exemplary embodiment, the difference (voltage difference) between the maximum value (maximum output voltage Vgmax) and minimum value (minimum output voltage Vgmin) of the output voltage with respect to the elapsed time is lower than the voltage difference in FIG. 5. That is, for example, the difference between maximum output voltage Vgmax supplied to first gate line G1 in the block and minimum output voltage Vgmin supplied to final (30th) gate line G30 decreases. Therefore, since the voltage difference at the boundary between the adjacent blocks decreases, the step (display unevenness) can be reduced in the region corresponding to the boundary between the blocks in the display image.

Figure 9:
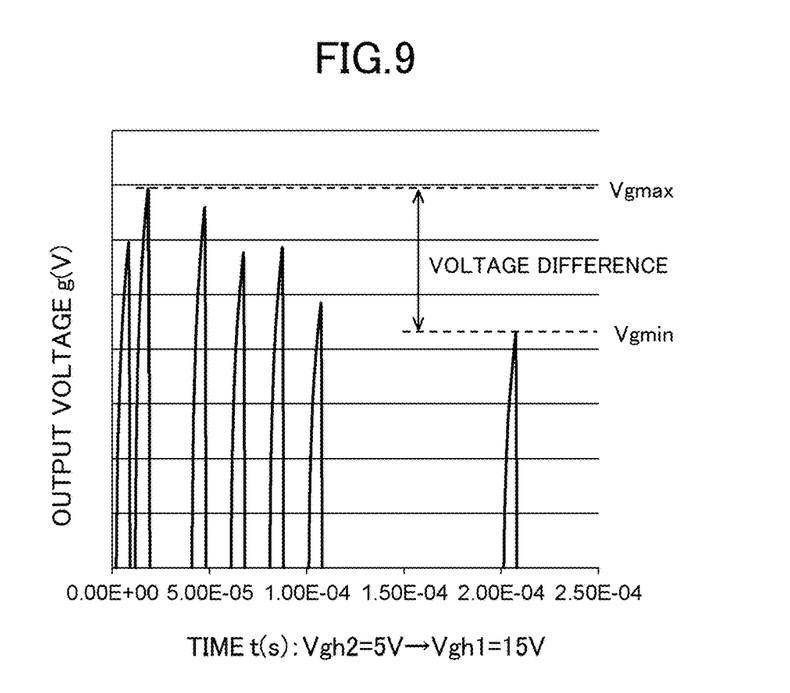
FIG. 9 is a graph illustrating a relationship between output voltage Vg(V) and time t(s) in another method for operating the display panel of the exemplary embodiment.
Figure 10:
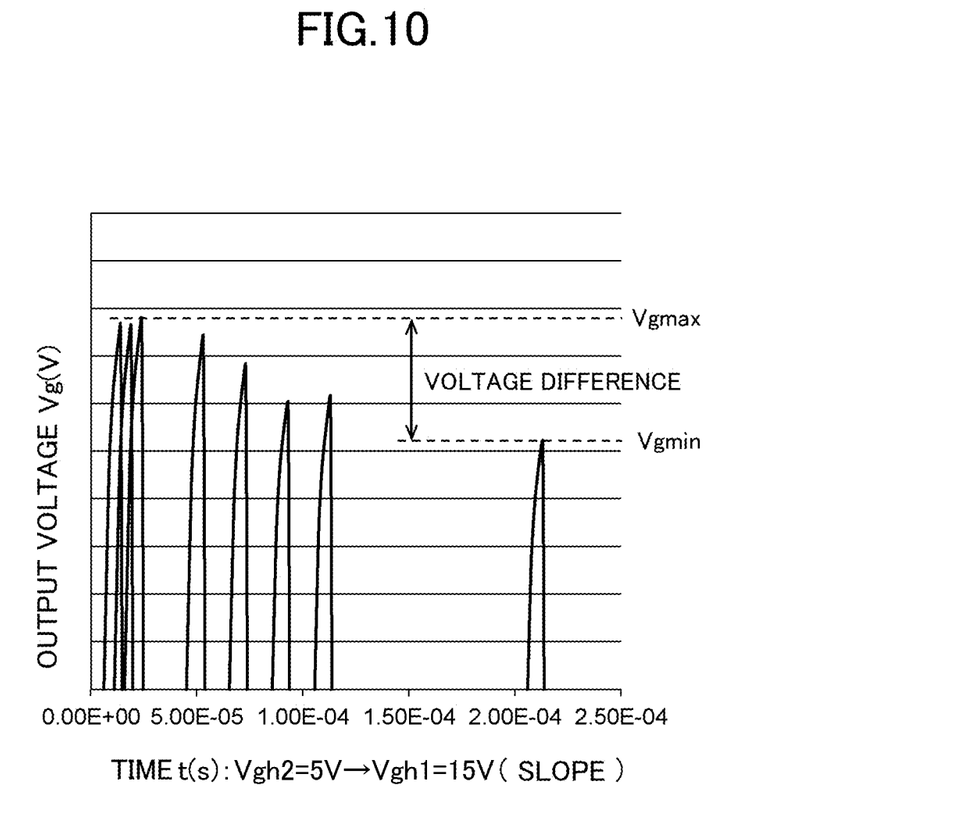
FIG. 10 is a graph illustrating a relationship between output voltage Vg(V) and time t(s) in another method for operating the display panel of the exemplary embodiment.

At this point, the voltage difference varies according to pre-gate voltage Vgh2. For example, FIG. 8 is the graph when pre-gate voltage Vgh2 is set to 10 V during voltage Vgh1 of 15 V. That is, in FIG. 8, pre-gate voltage Vgh2 is set to two thirds of voltage Vgh1. FIG. 9 is the graph when pre-gate voltage Vgh2 is set to 5 V during voltage Vgh1 of 15 V. That is, in FIG. 9, pre-gate voltage Vgh2 is set to one third of voltage Vgh1. Even if pre-gate voltage Vgh2 is set to 5 V, the voltage difference is set to be lower than the voltage difference in FIG. 5 in the operating method of the exemplary embodiment, so that the display unevenness can be reduced.

As a result of consideration on the setting value of pre-gate voltage Vgh2, it is preferable that pre-gate voltage Vgh2 satisfies 5(V)≤Vgh2<15(V) for Vgh1 of 15 V. That is, it is preferable that pre-gate voltage Vgh2 satisfies (Vgh1)/3≤Vgh2<Vgh1.

Thus, gate driver IC 3 selectively outputs gate-off voltage Vgl, pre-gate voltage Vgh2, and voltage Vgh1. For example, gate-off voltage Vgl is set to −5.5 V. Gate driver IC 3 selectively outputs gate-off voltage Vgl, pre-gate voltage Vgh2, and voltage Vgh1 while switching among gate-off voltage Vgl, pre-gate voltage Vgh2, and voltage Vgh1. As illustrated in FIG. 7, a signal waveform of the gate voltage supplied to gate voltage supplying wiring 31 includes a stepwise shape rising from a first half toward a second half.

Figure 11:
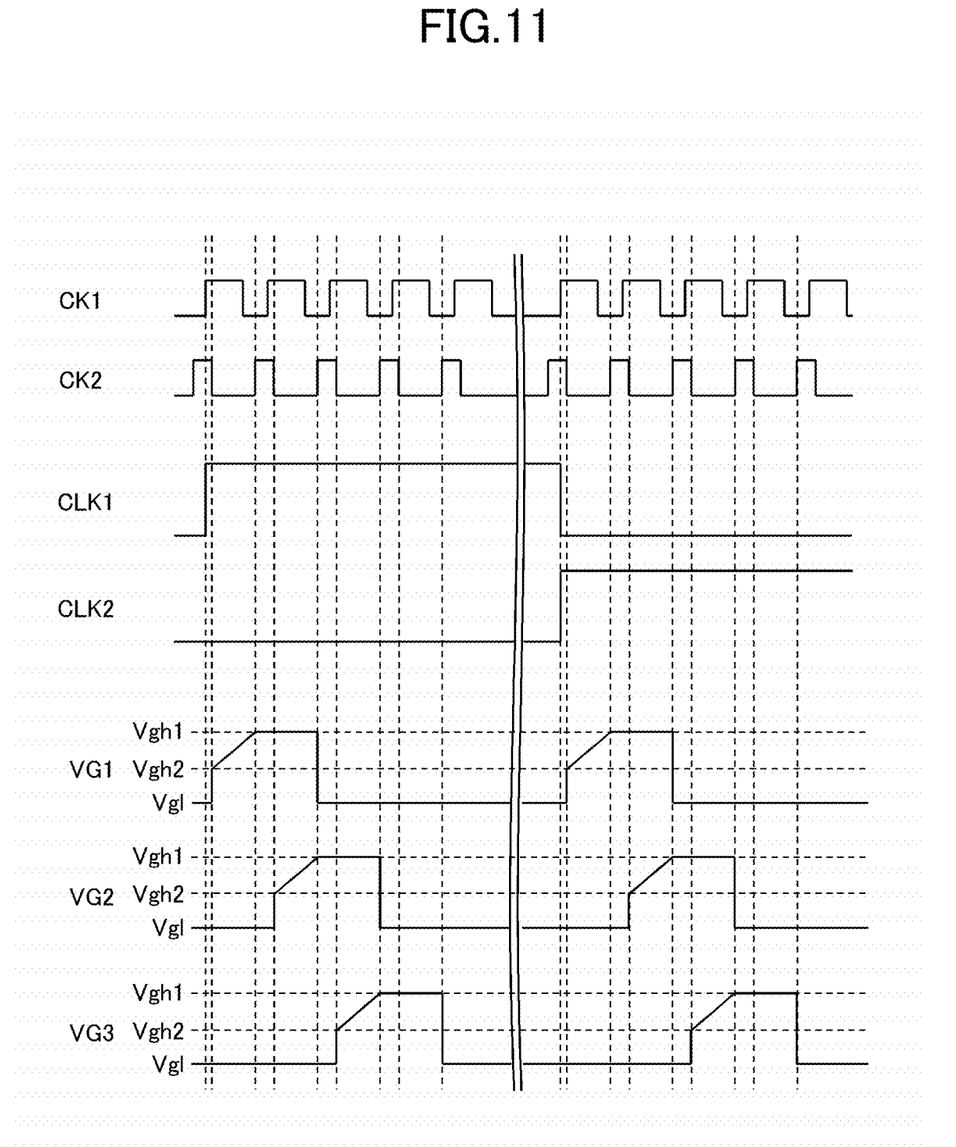
FIG. 11 is a timing chart illustrating another operation of the display panel with the gate selector system of the exemplary embodiment.

Liquid crystal display devices 100 of the exemplary embodiment is not limited to the above configuration. For example, a resistor may be provided on a power supply line of pre-gate voltage Vgh2. Therefore, as illustrated in FIG. 11, the gate voltage supplied to gate voltage supplying wiring 31 increases gradually. That is, the signal waveform of the gate voltage supplied to gate voltage supplying wiring 31 includes a slope shape (inclination) rising gradually from the first half toward the second half.

Gate driver IC 3 supplies pre-gate voltage Vgh2 to gate voltage supplying wiring 31 anytime before voltage Vgh1 is supplied to gate voltage supplying wiring 31. For example, gate driver IC 3 may supply pre-gate voltage Vgh2 to gate voltage supplying wiring 31 before one horizontal scanning (1H) in which time interval of voltage Vgh1 is supplied to gate voltage supplying wiring 31, ½H, or 2H.

In the configuration of the exemplary embodiment, gate driver IC 3 supplies pre-gate voltage Vgh2 to all gate voltage supplying wirings VG1 to VG30. However, the present disclosure is not limited to the configuration of the exemplary embodiment. For example, gate driver IC 3 may supply pre-gate voltage Vgh2 only to gate voltage supplying wiring 31 connected to gate line 12 disposed near the boundary between the blocks.

Pre-gate voltage Vgh2 may vary according to the position of gate line 12 in each block. For example, pre-gate voltage Vgh2 supplied to gate voltage supplying wiring 31 connected to gate line 12 having the later scanning order in the block may be set to be higher than pre-gate voltage Vgh2 supplied to gate voltage supplying wiring 31 connected to gate line 12 having the precedent scanning order. That is, in each block, corresponding pre-gate voltage Vgh2 may be set so as to increase gradually in a scanning direction of gate line 12.

In the above, the specific embodiments of the present application have been described, but the present application is not limited to the above-mentioned embodiments, and various modifications may be made as appropriate without departing from the spirit of the present application.

What is claimed is:

1. A display device, comprising:
a plurality of data lines extending in a first direction;
a plurality of gate lines extending in a second direction, the plurality of gate lines divided into groups that are adjacent in the first direction;
a plurality of selector transistors, each of which including a first conductive electrode and a second conductive electrode, wherein the first conductive electrode for each of the plurality of selector transistors is connected to an end of a gate line of the plurality of gate lines;
a plurality of selection signal supplying wirings, each of which is provided for a corresponding group and connected to a control electrode of a corresponding selector transistor of the plurality of the selector transistors for the corresponding group;
a plurality of gate voltage supplying wirings that are connected to the second conductive electrode of one of the selector transistors for each of the groups; and
a gate driver that sequentially supplies a first gate voltage to the plurality of gate voltage supplying wirings while supplying a control voltage to the plurality of selection signal supplying wirings in order to turn on or off the plurality of selector transistors,
wherein the gate driver supplies a second gate voltage to at least one of the plurality of gate voltage supplying wirings for each of the groups before supplying the first gate voltage that is used to turn on a pixel transistor disposed at an intersection portion of a data line among the plurality of data lines and a gate line among the plurality of gate lines,
wherein the second gate voltage is lower than the first gate voltage,
wherein the first gate voltage is Vgh1 and the second gate voltage is Vgh2, and the second gate voltage Vgh2 is set to satisfy (Vgh1)/3≤Vgh2<Vgh1.

2. The display device according to claim 1, wherein the gate driver supplies the second gate voltage to each of the gate voltage supplying wirings before supplying the first gate voltage.

3. The display device according to claim 1, wherein the gate driver supplies the second gate voltage to a gate voltage supplying wiring among the plurality of gate voltage supply wirings connected to a gate line among the plurality of gate lines disposed near a boundary between the two adjacent groups among the plurality of groups before supplying the first gate voltage.

4. The display device according to claim 1, wherein, for a first gate line and a second gate line among the plurality of gate lines that are adjacent to each other in a scanning direction, the gate driver supplies the second gate voltage to a gate voltage supplying wiring connected to the second gate line during a time interval in which the first gate voltage is supplied to a gate voltage supplying wiring connected to the first gate line.

5. The display device according to claim 1, wherein a signal waveform of the first gate voltage supplied to each of the plurality of gate voltage supplying wirings includes a stepwise shape rising from a first half toward a second half.

6. The display device according to claim 1, wherein a signal waveform of the first gate voltage supplied to each of the plurality of gate voltage supplying wirings includes a slope shape that rises gradually from a first half toward a second half.

7. The display device according to claim 1, wherein the second gate voltage has a voltage level at which the pixel transistor is turned on.

8. A drive method of a display device including a plurality of data lines extending in a first direction, a plurality of gate lines extending in a second direction, the plurality of gate lines divided into groups that are adjacent in the first direction, a plurality of selector transistors, each of which including a first conductive electrode and a second conductive electrode, wherein the first conductive electrode for each of the plurality of selector transistors is connected to an end of a gate line of the plurality of gate lines, a plurality of selection signal supplying wirings, each of which is provided for a corresponding group and connected to a control electrode of a corresponding selector transistor of the plurality of the selector transistors for the corresponding group, a plurality of gate voltage supplying wirings that are connected to the second conductive electrode of one of the selector transistors for each of the groups, and a gate driver that supplies a gate voltage to the plurality of gate voltage supplying wirings while supplying a control voltage to the plurality of selection signal supplying wirings in order to turn on or off the plurality of selector transistors, the drive method comprising:

sequentially supplying, via the gate driver, a first gate voltage to the plurality of gate voltage supplying wirings while supplying a control voltage to the plurality of selection signal supplying wirings in order to turn on or off the selector transistor;

sequentially supplying, via the gate driver, a second gate voltage having a voltage level lower than the first gate voltage to at least one gate voltage supplying wiring among the plurality of gate voltage supplying wirings in each of the groups; and turning on, via the first gate voltage, a pixel transistor that is disposed in an intersection portion of a data line among the plurality of data lines and a gate line among the plurality of gate lines, wherein the second gate voltage is supplied to the at least one gate voltage supplying wiring before the first gate voltage turns on the pixel transistor, wherein the first gate voltage is Vgh1 and the second gate voltage is Vgh2, and the second gate voltage Vgh2 is set to satisfy $(Vgh1)/3 \leq Vgh2 < Vgh1$.

* * * * *